US008983547B2

(12) United States Patent
Jeong et al.

(10) Patent No.: US 8,983,547 B2
(45) Date of Patent: Mar. 17, 2015

(54) APPARATUS AND METHOD FOR BEAM SELECTING IN BEAMFORMED WIRELESS COMMUNICATION SYSTEM

(75) Inventors: Su-Ryong Jeong, Yongin-si (KR); Tae-Young Kim, Seongnam-si (KR); Chi-Woo Lim, Suwon-si (KR); Hyun-Kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 13/618,301

(22) Filed: Sep. 14, 2012

(65) Prior Publication Data

US 2013/0072244 A1 Mar. 21, 2013

(30) Foreign Application Priority Data

Sep. 15, 2011 (KR) ........................ 10-2011-0092906
Sep. 14, 2012 (KR) ........................ 10-2012-0102020

(51) Int. Cl.

| | |
|---|---|
| ***H04M 1/00*** | (2006.01) |
| ***H04W 88/00*** | (2009.01) |
| ***H04B 7/06*** | (2006.01) |
| ***H04B 7/08*** | (2006.01) |
| *H04W 72/04* | (2009.01) |
| *H04W 74/00* | (2009.01) |

(52) U.S. Cl.

CPC ............ *H04B 7/0617* (2013.01); *H04B 7/0695* (2013.01); *H04B 7/086* (2013.01); *H04B 7/088* (2013.01); *H04W 72/042* (2013.01); *H04W 72/046* (2013.01); *H04W 74/008* (2013.01)

USPC ........ 455/562.1; 455/277.1; 455/62; 455/275

(58) Field of Classification Search

USPC ........... 455/562.1, 517, 446, 452.1, 447, 455, 455/456.1, 464, 509, 515, 525, 62, 67.11, 455/452.2, 277.1, 275; 342/367, 372, 342/357.64

See application file for complete search history.

(56) References Cited

U.S. PATENT DOCUMENTS

| | | | | |
|---|---|---|---|---|
| 6,178,140 | B1 | 1/2001 | Schlieter | |
| 6,512,481 | B1 * | 1/2003 | Velazquez et al. | 342/367 |
| 2004/0214606 | A1 * | 10/2004 | Wichman et al. | 455/562.1 |
| 2010/0127931 | A1 * | 5/2010 | Rensburg et al. | 342/372 |
| 2010/0246476 | A1 | 9/2010 | Hethuin et al. | |
| 2011/0110453 | A1 * | 5/2011 | Prasad et al. | 375/285 |

* cited by examiner

*Primary Examiner* — John J Lee

(74) *Attorney, Agent, or Firm* — Jefferson IP Law, LLP

(57) ABSTRACT

An apparatus and a method for reducing delay during beam alignment in a beamformed wireless communication system are provided. A method for selecting a beam pattern in a Base Station (BS) includes determining whether a direction finding signal is received through each time interval of a direction finding channel, transmitting information of whether the direction finding signal is received with respect to each time interval of the direction finding channel, changing a receive beam pattern and receiving a random access signal from a Mobile Station (MS) with at least one transmit beam pattern over a random access channel, and selecting one of transmit beam patterns of the MS and one of receive beam patterns of the BS according to the random access signal.

26 Claims, 11 Drawing Sheets

START
OBTAIN SYNCHRONIZATION WITH BS — 701
CONFIRM DIRECTION FINDING CHANNEL AND RANDOM ACCESS CHANNEL ALLOCATION INFORMATION — 703
CHANGE THE TRANSMIT BEAM PATTERN AND SEND DIRECTION FINDING SIGNAL — 705
707 RECEIVE DIRECTION FINDING INFORMATION? — NO / YES
IDENTIFY CANDIDATE TRANSMIT BEAM PATTERN BASED ON DIRECTION FINDING INFORMATION — 709
SEND RANDOM ACCESS SIGNAL WITH CANDIDATE TRANSMIT BEAM PATTERN — 711
CONFIRM UPLINK BEAM ALIGNMENT INFORMATION — 713
END

APPARATUS AND METHOD FOR BEAM SELECTING IN BEAMFORMED WIRELESS COMMUNICATION SYSTEM

PRIORITY

This application claims the benefit under 35 U.S.C. §119 (a) of a Korean patent application filed on Sep. 15, 2011 in the Korean Intellectual Property Office and assigned Serial No. 10-2011-0092906 and a Korean patent application filed on Sep. 14, 2012 in the Korean Intellectual Property Office and assigned Serial No. 10-2012-0102020, the entire disclosures of which are hereby incorporated by reference.

BACKGROUND OF THE INVENTION

1. Field of the Invention

The present invention relates to a beamformed wireless communication system. More particularly, the present invention relates to an apparatus and a method for uplink beam alignment for initial access of a mobile station in a beamformed wireless communication system.

2. Description of the Related Art

To meet wireless data traffic demand continuously increasing, wireless communication systems are advancing for supporting a high data rate. For example, to increase the data rate, the wireless communication system is under development to enhance spectral efficiency based on communication techniques such as Orthogonal Frequency Division Multiple Access (OFDMA) and Multiple Input Multiple Output (MIMO).

However, as the demand for smart phones and tablet Personal Computers (PCs) increases and accordingly high traffic applications increase, the demand for data traffic correspondingly increases and thus it is hard to satisfy the increased wireless data traffic demand merely with related-art technologies such as spectral efficiency enhancement.

To address this shortcoming, a wireless communication system using an Ultra-High Frequency (UHF) band is attracting much attention.

When supporting the wireless communication over the UHF band, the wireless communication system is subject to increasing propagation losses such as path loss or return loss, due to frequency properties of the frequency band. As a result, the propagation distance is shortened because of the propagation loss and the service coverage area of the wireless communication system using the ultra-high frequency band is reduced.

The wireless communication system using the UHF band can expand its service coverage area by alleviating the path loss of the propagation using a beamforming technique and lengthening the propagation distance.

By use of the beamforming technique, a transmitting stage can make a plurality of transmit beam patterns of different directions. A receiving stage may receive a plurality of receive beam patterns of different directions.

As such, when using the beamforming technique, the transmitting stage and the receiving stage of the wireless communication system require a technique for selecting the transmit beam pattern and the receive beam pattern so as to achieve optimal transmission efficiency.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention to provide an apparatus and a method for selecting a transmit beam pattern and a receive beam pattern to achieve optimal transmission efficiency in a wireless communication system using a beamforming technique.

Another aspect of the present invention is to provide an apparatus and a method for reducing delay according to transmit beam pattern and receive beam pattern selection in a wireless communication system using a beamforming technique.

Yet another aspect of the present invention is to provide an apparatus and a method for reducing an initial access delay of a mobile station in a wireless communication system using a beamforming technique.

Still another aspect of the present invention is to provide an apparatus and a method for selecting a transmit beam pattern and a receive beam pattern to achieve optimal transmission efficiency when a mobile station initially accesses in a wireless communication system using a beamforming technique.

A further aspect of the present invention is to provide an apparatus and a method for reducing delay according to transmit beam pattern and receive beam pattern selection when a mobile station initially accesses in a wireless communication system using a beamforming technique.

According to an aspect of the present invention, a method for selecting a beam pattern in a Base Station (BS) of a wireless communication system which generates a plurality of beam patterns is provided. The method includes determining whether a direction finding signal is received through each time interval of a direction finding channel, transmitting information of whether the direction finding signal is received with respect to each time interval of the direction finding channel, changing a receive beam pattern and receiving a random access signal from a Mobile Station (MS) with at least one transmit beam pattern over a random access channel, and selecting one of transmit beam patterns of the MS and one of receive beam patterns of the BS according to the random access signal.

According to another aspect of the present invention, a method for transmitting a signal in an MS of a wireless communication system which generates a plurality of beam patterns is provided. The method includes changing a transmit beam pattern and transmitting a direction finding signal to a BS through time intervals of a direction finding channel, identifying at least one time interval in which the BS receives the direction finding signal from among time intervals of the direction finding channel, determining a transmit beam pattern carrying the direction finding channel in the at least one time interval in which the BS receives the direction finding signal as a candidate transmit beam pattern, and transmitting a random access signal to the BS using the candidate transmit beam pattern.

According to yet another aspect of the present invention, an apparatus for selecting a beam pattern in a BS of a wireless communication system which generates a plurality of beam patterns is provided. The apparatus includes at least one antenna comprising a plurality of antenna elements; a transmitter for transmitting information of whether a direction finding signal is received with respect to each time interval of a direction finding channel, and a controller for determining whether the direction finding signal is received in each time interval of the direction finding channel, and for selecting one of transmit beam patterns of an MS and one of receive beam patterns of the BS according to a random access signal received by changing a receive beam pattern over a random access channel.

According to still another aspect of the present invention, an apparatus for transmitting a signal in an MS of a wireless communication system which generates a plurality of beam patterns is provided. The apparatus includes at least one antenna comprising a plurality of antenna elements, a beam setter for selecting a transmit beam pattern to transmit a signal through the antenna, from among a plurality of transmit beam patterns supportable by the MS, a transmitter for changing the transmit beam pattern and for transmitting a direction finding signal to a BS through time intervals of a direction finding channel, and a controller for determining a transmit beam pattern carrying the direction finding channel in the at least one time interval in which the BS receives the direction finding signal from among the time intervals of the direction finding channel as a candidate transmit beam pattern. The transmitter transmits a random access signal to the BS using the candidate transmit beam pattern determined by the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for reducing delay during beam alignment in a beamformed wireless communication system. Herein, the beam alignment indicates a series of processes for selecting a transmit beam pattern and a receive beam pattern to build an optimal channel for sending and receiving signals in a transmitting stage supporting a plurality of transmit beam patterns and a receiving stage supporting a plurality of receive beam patterns.

Hereinafter, it is assumed that uplink beam alignment is performed in an initial access of a Mobile Station (MS).

Figure 1:
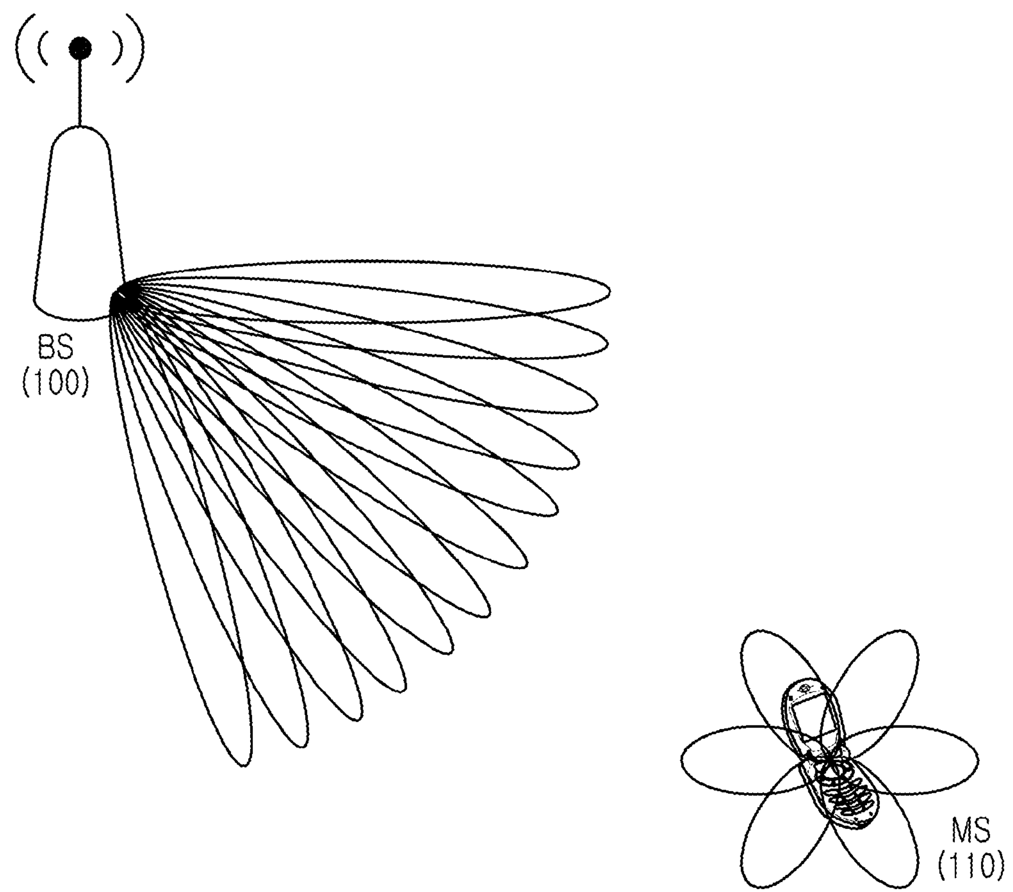
FIG. 1 illustrates transmit beams of a mobile station and receive beams of a base station in a wireless communication system according to an exemplary embodiment of the present invention.

When the MS is capable of forming the transmit beams of different directions, the MS can form the transmit beams in different directions as shown in FIG. 1. When a Base Station (BS) is capable of forming the receive beams of different directions, the BS can form the receive beams in different directions as shown in FIG. 1.

FIG. 1 illustrates the transmit beams of the MS and the receive beams of the BS in a wireless communication system according to an exemplary embodiment of the present invention.

Referring to FIG. 1, the MS 110 supports the multiple transmit beam patterns to form the beam in different directions. The BS 100 supports the multiple receive beam patterns to receive a signal from different directions.

When the MS 110 initially accesses the BS 100, the BS 100 and the MS 110 perform uplink beam alignment for the initial access of the MS 110. For example, the MS 110, which does not know information of a location of the BS 100, sends a random access signal with all of the transmit beam patterns supported. The MS 110 sends the random access signal so that the BS 100 can receive the random access signal sent with all of the transmit beam patterns supported by the MS 110, with the receive beam patterns. Hence, when the MS 110 supports N-ary transmit beam patterns of different directions and the BS 100 supports M-ary receive beam patterns of different directions, the MS 110 sends the random access signal N×M times.

The BS 100 receives the random access signal from the MS 110 by changing the receive beam pattern and selects an optimal transmit beam pattern of the MS 110 and its optimal receive beam pattern.

As above, when the MS 110 and the BS 100 align the uplink beam, the wireless communication system delays the initial access of the MS 110 because of the random access signal transmission delay of the MS 110.

Figure 2:
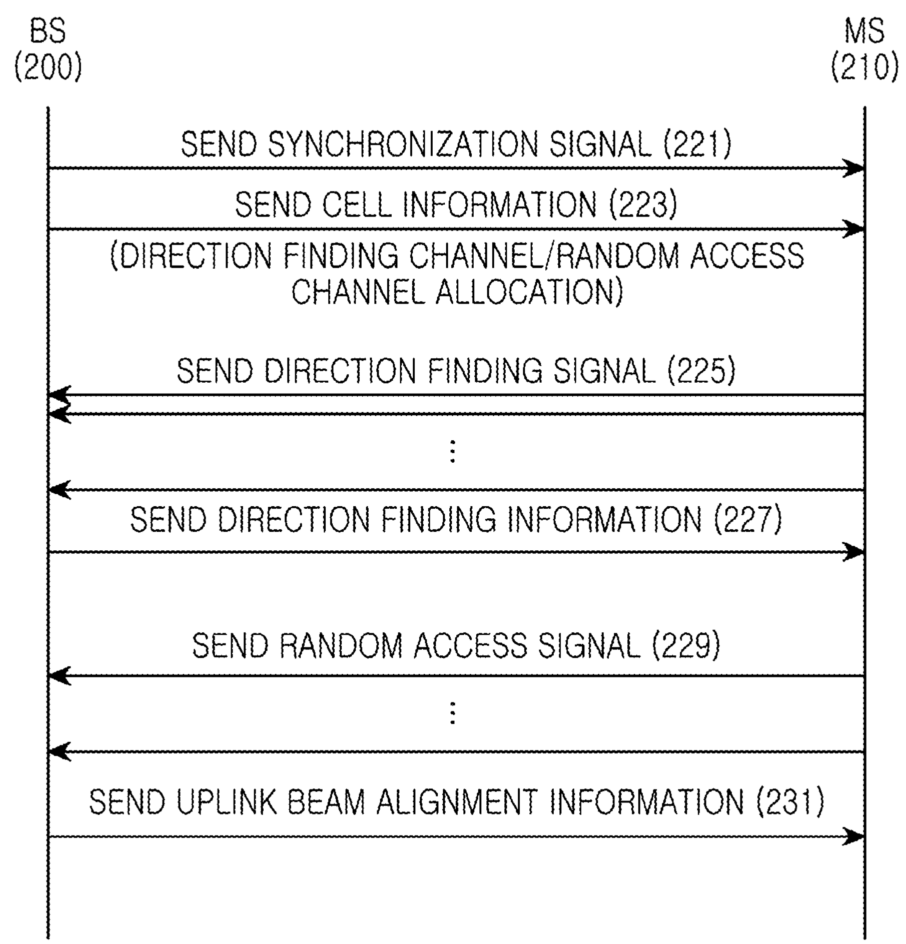
FIG. 2 illustrates a method for beam alignment in the wireless communication system according to an exemplary embodiment of the present invention.

Thus, the BS 100 and the MS 110 can restrict the number of the transmit beam patterns for carrying the random access signal for the sake of the uplink beam alignment as shown in FIG. 2.

FIG. 2 illustrates a method for the beam alignment in the wireless communication system according to an exemplary embodiment of the present invention.

Referring to FIG. 2, a BS 200 broadcasts a synchronization channel over its service coverage area in step 221. For example, the BS 200 may periodically broadcast the synchronization channel. Alternatively, the BS 200 may non-periodically broadcast the synchronization channel. In so doing, an MS 210 obtains synchronization with the BS 200 using the synchronization channel provided from the BS 200.

In step 223, the BS 200 broadcasts cell information over the service coverage area. For example, the cell information includes resource allocation information of a direction finding channel and a random access channel and information about the number of the receive beam patterns supported by the BS 200. Herein, the resource allocation information of the direction finding channel and the random access channel includes information for locating signals transmitted by the MS over the direction finding channel and the random access channel. For example, the resource allocation information of the direction finding channel and the random access channel includes at least one of location information and period information of the direction finding channel and the random access channel. The resource allocation information of the direction finding channel and the random access channel may be defined in advance using, besides a broadcast channel, system architecture between the MS 210 and the BS 200.

The number information of the receive beam patterns may include number information of the receive beam patterns to be used by the BS 200 to receive a signal over the direction finding channel. In detail, the number information of the receive beam patterns can include at least one of the number (M1) of the receive beam patterns to be used by the BS 200 to receive a signal over the direction finding channel, and number (N1) for applying the same receive beam in one direction finding channel. The N1 indicate how many times the same receive beam is applied.

Figure 3:
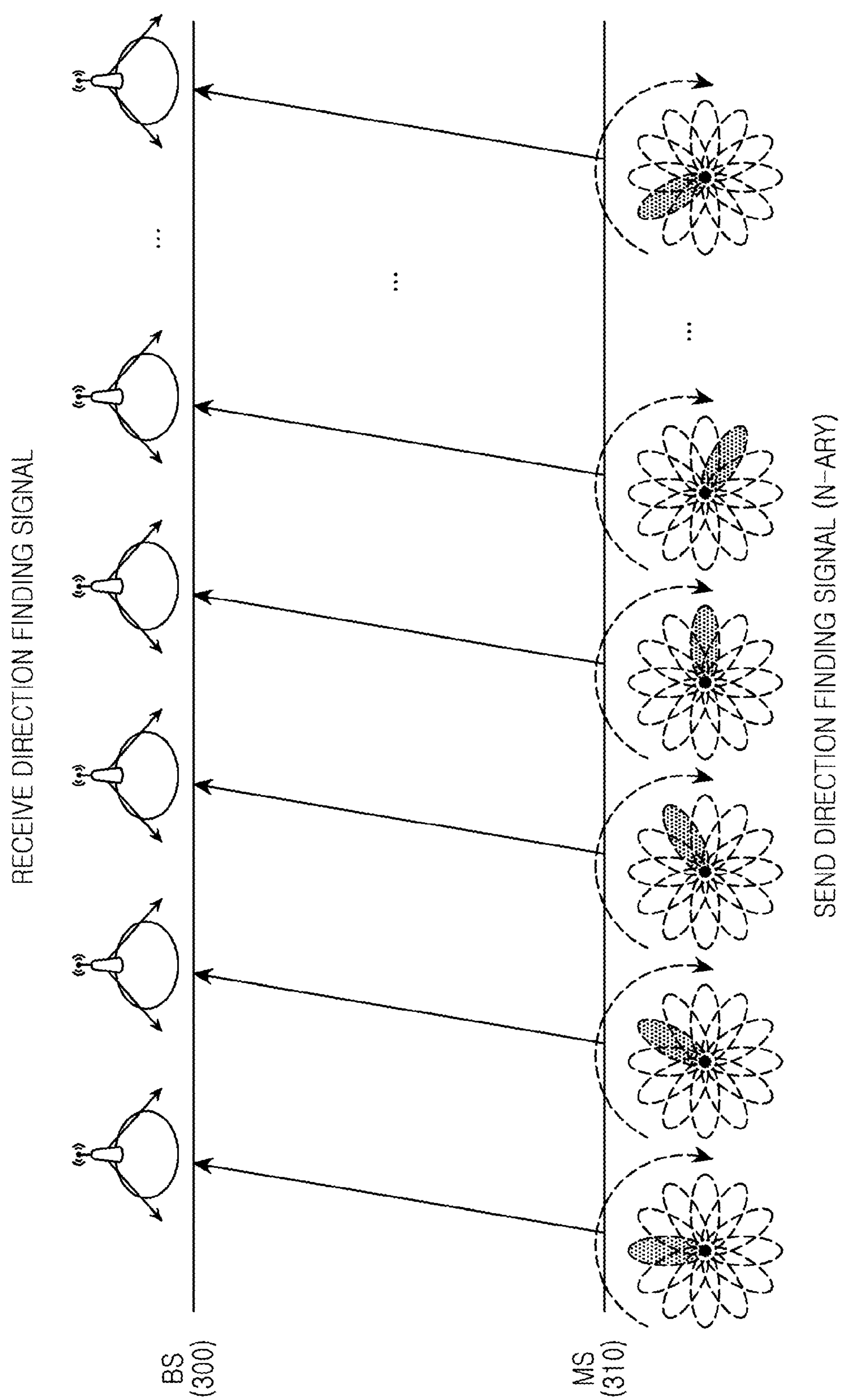
FIG. 3 illustrates a construction for transmitting a direction finding signal in the mobile station according to an exemplary embodiment of the present invention.

The MS 210 sends a direction finding signal, based on the resource allocation information of the direction finding channel received from the BS 200, in step 225. For example, the MS 210 may send the direction finding signal by changing the transmit beam pattern per time interval of the direction finding channel, as shown in FIG. 3. The BS 200 and the MS 210 correspond to BS 300 and MS 310 in FIG. 3. In so doing, the MS 210 can determine the type of the transmit beam to be used to send a direction finding signal according to the number information of the receive beam patterns received from the BS 200. For example, the MS 210 can send the direction finding signal using the beam in the same transmission direction corresponding to M1, according to the number (M1) of the receive beam patterns to be used by the BS 200 to receive a signal over the direction finding channel. For example, the MS 210 may send the direction finding signal using the beams of the different transmission directions corresponding to N1, according to the number (N1) for applying the same receive beam in one direction finding channel.

Figure 4B:
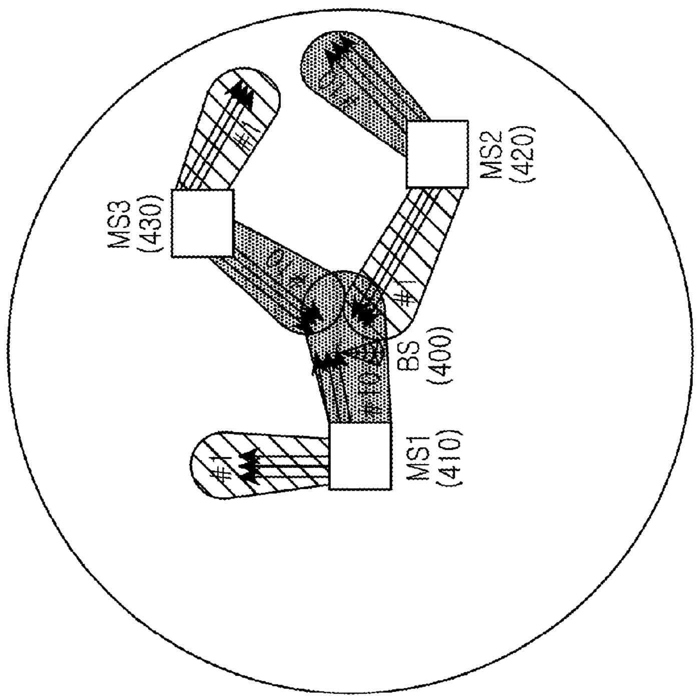
FIG. 4 illustrates a construction for transmitting direction finding information in the base station according to an exemplary embodiment of the present invention.
Figure 4A:
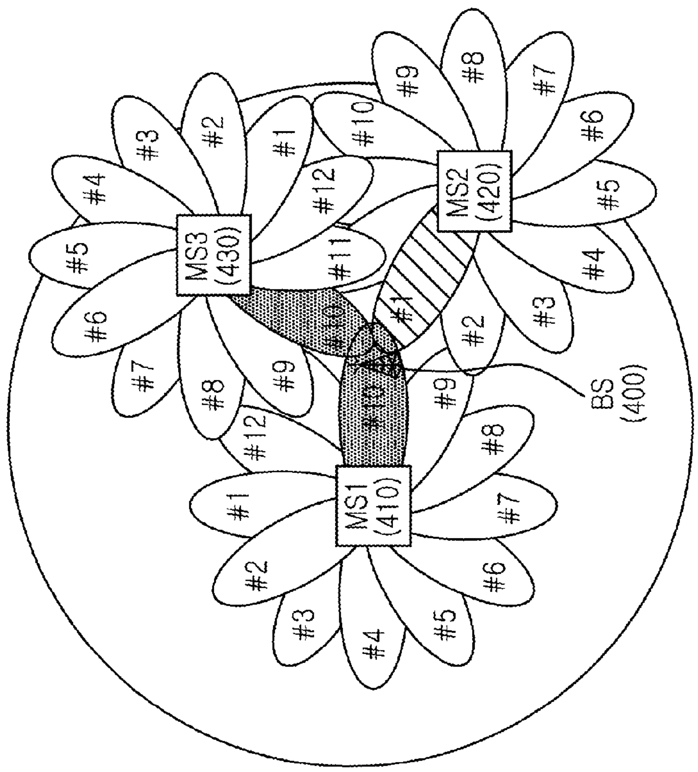

The BS 200 identifies the time interval of receiving the direction finding signal from the MS 210 from among the time intervals of the direction finding channel. In so doing, the BS 200 checks whether the direction finding signal is received by not applying the reception beamforming or by using the receive beam pattern of a wide beam width. For example, when the direction finding channel includes 12 time intervals as shown in FIG. 4A, MSs 410, 420, and 430 send the direction finding signal by changing the transmit beam pattern in each of the 12 time intervals. A BS 400 determines whether the direction finding signal is received in each time interval. When receiving the direction finding signals of the first MS 410 and the third MS 430 over the 10th time interval and receiving the direction finding signal of the second MS 420 over the first time interval, the BS 400 recognizes that the direction finding signals are received in the first and 10th time intervals of the MSs. Herein, the BS 400 determines whether the direction finding signal is received in each time interval by considering a receive power of the time interval or a correlation value of the received signal.

In step 227, the BS 200 transmits to the MS 210 information of at least one time interval receiving the direction finding signal from among the time intervals of the direction finding channel. In so doing, the BS 200 transmits to the MS 210 direction finding information including the time interval information of the received direction finding signal. For example, when receiving the direction finding signals in the first and 10th time intervals of FIG. 4A, the BS 400 generates and transmits to the MS 410 a bitmap indicating the reception information of the direction finding signals of the first and 10th time intervals, as shown in FIG. 4B. Herein, the bitmap of FIG. 4B sets the time interval receiving the direction finding signal to “1”.

The MS 210 recognizes the transmit beam pattern carrying the direction finding signal over the time interval of the BS 200 receiving the direction finding signal as a candidate transmit beam pattern. For example, upon receiving the bitmap of FIG. 4B from the BS 200, the MS 410 recognizes two transmit beam patterns carrying the direction finding signal over the first and 10th time intervals of the direction finding channel, as the candidate transmit beam patterns.

Figure 5:
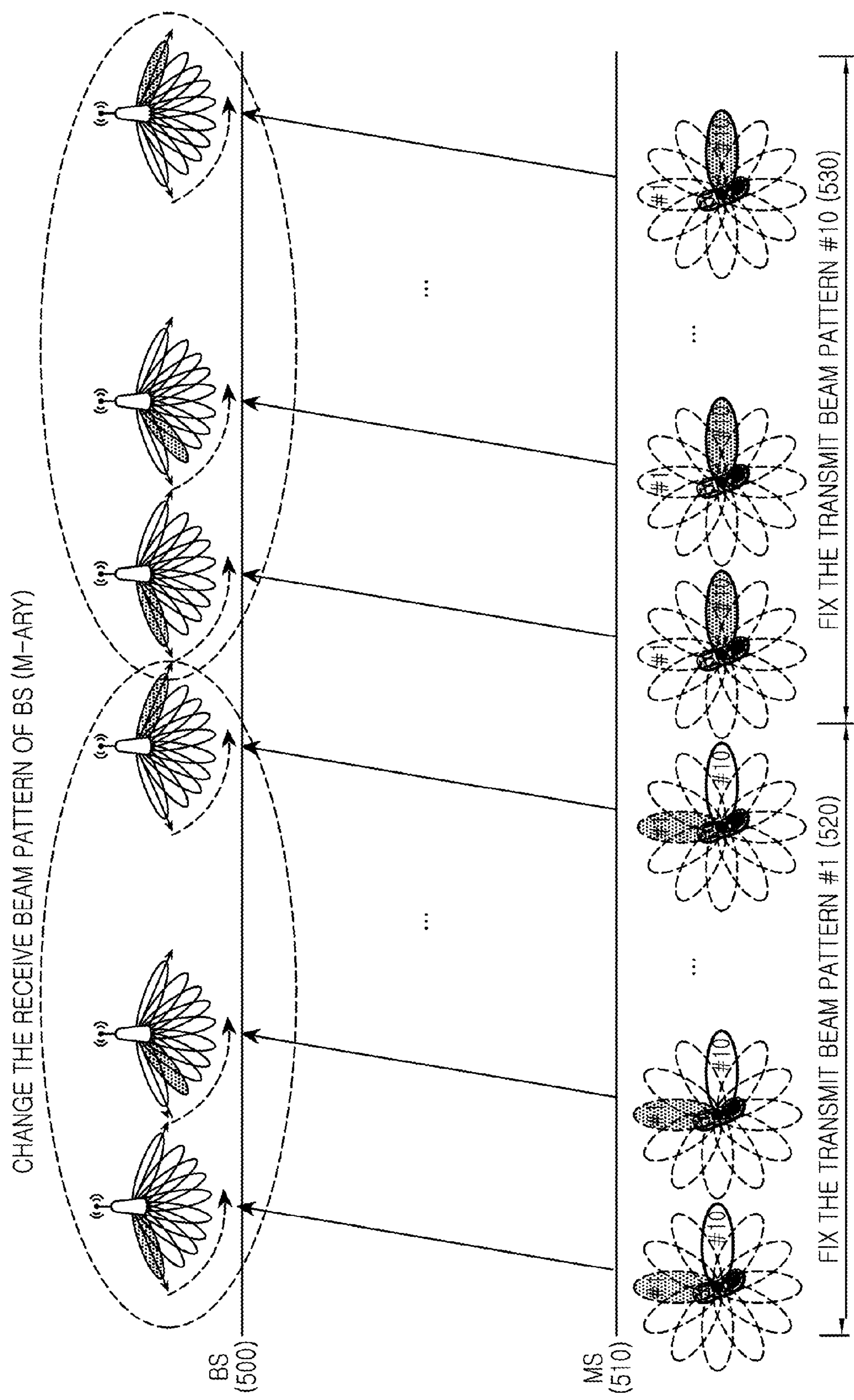
FIG. 5 illustrates a construction for transmitting a random access signal in the mobile station according to an exemplary embodiment of the present invention.

In step 229, the MS 210 sends the random access signal using the candidate transmit beam pattern. In so doing, the MS 210 sends the random access signal using the candidate transmit beam patterns based on all of the supportable receive beam patterns of the BS 200. For example, when the transmit beam patterns #1 and #10 are the candidate transmit beam patterns and a BS 500 supports M-ary receive beam patterns as shown in FIG. 5, an MS 510 repeatedly sends the random access signal M times with the transmit beam pattern #1 in step 520. Next, the MS 510 repeatedly sends the random access signal with the transmit beam pattern #10 in step 530. Herein, the random access signal includes identification information of the MS 510.

The BS 200 selects an optimal transmit beam pattern of the MS 210 and an optimal receive beam pattern of the BS 200 using the random access signals received with the receive beam patterns, so as to send and receive signals to and from the MS 210. For example, the BS 200 estimates channel status of each transmit beam pattern and receive beam pattern combination using the random access signals received with the receive beam patterns. Next, the BS 200 selects the transmit beam pattern and receive beam pattern combination of the best channel status, as the optimal transmit beam pattern of the MS 210 and the optimal receive beam pattern of the BS 200 to send and receive signals to and from the MS 210.

In step 231, the BS 200 transmits to the MS 210 uplink beam alignment information including the optimal transmit beam pattern information of the MS 210 and the optimal receive beam pattern information of the BS 200.

As such, when the BS 200 receives the direction finding signal without the reception beamforming or with the receive beam pattern of the wide beam width, a transmission distance of the direction finding signal is shortened, compared to a case where the BS 200 uses the receive beam pattern of a narrow beam width. Thus, the MS 210 sends the direction finding signal using a minimum tone so as to lengthen the transmission distance of the direction finding signal. In detail, when the BS 200 uses the receive beam pattern of the narrow beam width and the MS 210 sends the signal using 16 tones, the MS 210 sends the direction finding signal over the single tone. In this case, the MS 210 can extend the transmission distance of the direction finding signal according to the transmit power concentration of 12 dB ($10\times\log_{10}(16)$).

For example, to extend the transmission distance of the direction finding signal, the MS 210 may send the direction finding signal using a minimum subcarrier.

For another example, to extend the transmission distance of the direction finding signal, the MS 210 may send the direction finding signal using a minimum frequency band.

For another example, the MS 210 may extend the transmission distance of the direction finding signal using a repetition code.

For another example, the MS 210 may extend the transmission distance of the direction finding signal using a low-code rate code.

Figure 6:
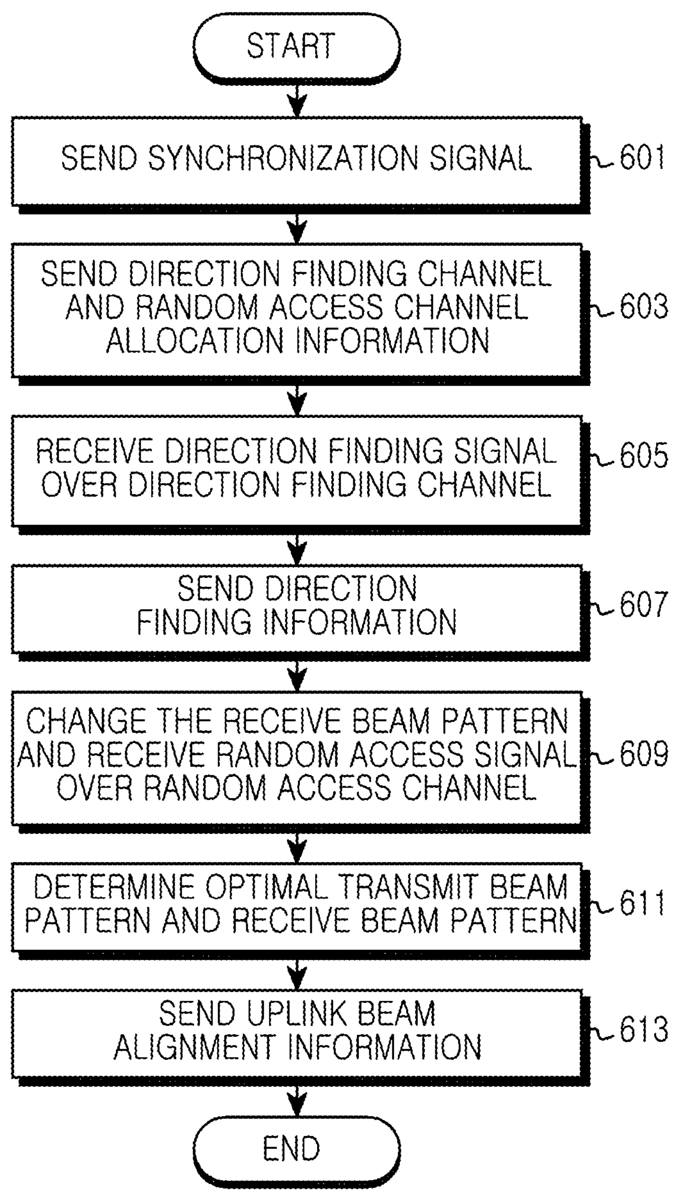
FIG. 6 illustrates a beam alignment method of the base station in the wireless communication system according to an exemplary embodiment of the present invention.

FIG. 6 illustrates a beam alignment method of the BS in the wireless communication system according to an exemplary embodiment of the present invention.

Referring to FIG. 6, the BS sends the synchronization channel to the MS traveling in the service coverage area in step 601. For example, the BS may periodically broadcast the synchronization channel. For another example, the BS may non-periodically broadcast the synchronization channel.

In step 603, the BS transmits the cell information to the MS traveling in the service coverage area. For example, the BS may transmit the cell information over its service coverage area. Herein, the cell information includes resource allocation information of the direction finding channel, resource allocation information of the random access channel, and information about the number of the receive beam patterns supported by the BS. The resource allocation information of the direction finding channel and the random access channel includes the information for locating signals transmitted by the MS over the direction finding channel and the random access channel. For example, the resource allocation information of the direction finding channel and the random access channel includes at least one of the location information and the period information of the direction finding channel and the random access channel. The resource allocation information of the direction finding channel and the random access channel may be defined in advance using, besides the broadcast channel, the system architecture between the MS and the BS.

The number information of the receive beam patterns may include the number information of the receive beam patterns to be used by the BS to receive a signal over the direction finding channel. In detail, the number information of the receive beam patterns can include at least one of the number (M1) of the receive beam patterns to be used by the BS to receive the signal over the direction finding channel, and the number (N1) for applying the same receive beam in one direction finding channel. The N1 indicate how many times the same receive beam is applied. That is, the number information of the receive beam patterns can include necessary information for determining the type of the transmit beam to be used by the MS to send the direction finding signal.

In step 605, the BS determines whether the direction finding signal is received in each time interval of the direction finding signal. In so doing, the BS checks whether the direction finding signal is received per time interval of the direction finding channel without the reception beamforming or with the receive beam pattern of the wide beam width. For example, when the MSs 410, 420, and 430 send the direction finding signal over the 12 time intervals of the direction finding channel as shown in FIG. 4A, the BS 400 determines whether the direction finding signal is received in each time interval. When receiving the direction finding signals of the first MS 410 and the third MS 430 over the 10th time interval and receiving the direction finding signal of the second MS 420 over the first time interval, the BS 400 recognizes that the direction finding signals are received in the first and 10th time intervals of the MSs. Herein, the BS 400 determines whether the direction finding signal is received in each time interval by considering the receive power of the time interval or the correlation value of the received signal.

Upon receiving the direction finding signal over the direction finding channel, the BS transmits the information of at least one time interval for receiving the direction finding signal among the time intervals of the direction finding channel over the service coverage area in step 607. In so doing, the BS transmits the direction finding information including the time interval information of the received direction finding signal, to the MS traveling in the service coverage area. For example, when the BS 400 receives the direction finding signals in the first and 10th time intervals of FIG. 4A, the BS 400 generates and transmits to the MS 410 the bitmap indicating the reception information of the direction finding signals of the first and 10th time intervals, as shown in FIG. 4B. Herein, the bitmap of FIG. 4B sets the time interval receiving the direction finding signal to "1".

In step 609, the BS changes the receive beam pattern and receives the random access signal over the random access channel. For example, when the transmit beam patterns #1 and #10 of the MS 510 are the candidate transmit beam patterns as shown in FIG. 5, the BS 500 changes the receive beam pattern and receives the random access signal from the MS 510 with the transmit beam pattern #1 in step 520. Next, the BS 500 changes the receive beam pattern and receives the random access signal from the MS 510 with the transmit beam pattern #10 in step 530. Herein, the random access signal includes the identification information of the MS 510.

In step 611, the BS selects an optimal MS transmit beam pattern and an optimal BS receive beam pattern using the random access signals received in the receive beam patterns, so as to send and receive signals to and from the MS. For example, the BS estimates the channel status of the transmit beam pattern and receive beam pattern combinations using the random access signals received with the receive beam patterns. Next, the BS selects the transmit beam pattern and receive beam pattern combination of the best channel status, as the optimal MS transmit beam pattern and the optimal BS receive beam pattern, to send and receive signals to and from the MS.

In step 613, the BS transmits to the MS, the uplink beam alignment information including the optimal MS transmit beam pattern and optimal BS receive beam pattern information.

Next, the BS finishes this process.

Figure 7:
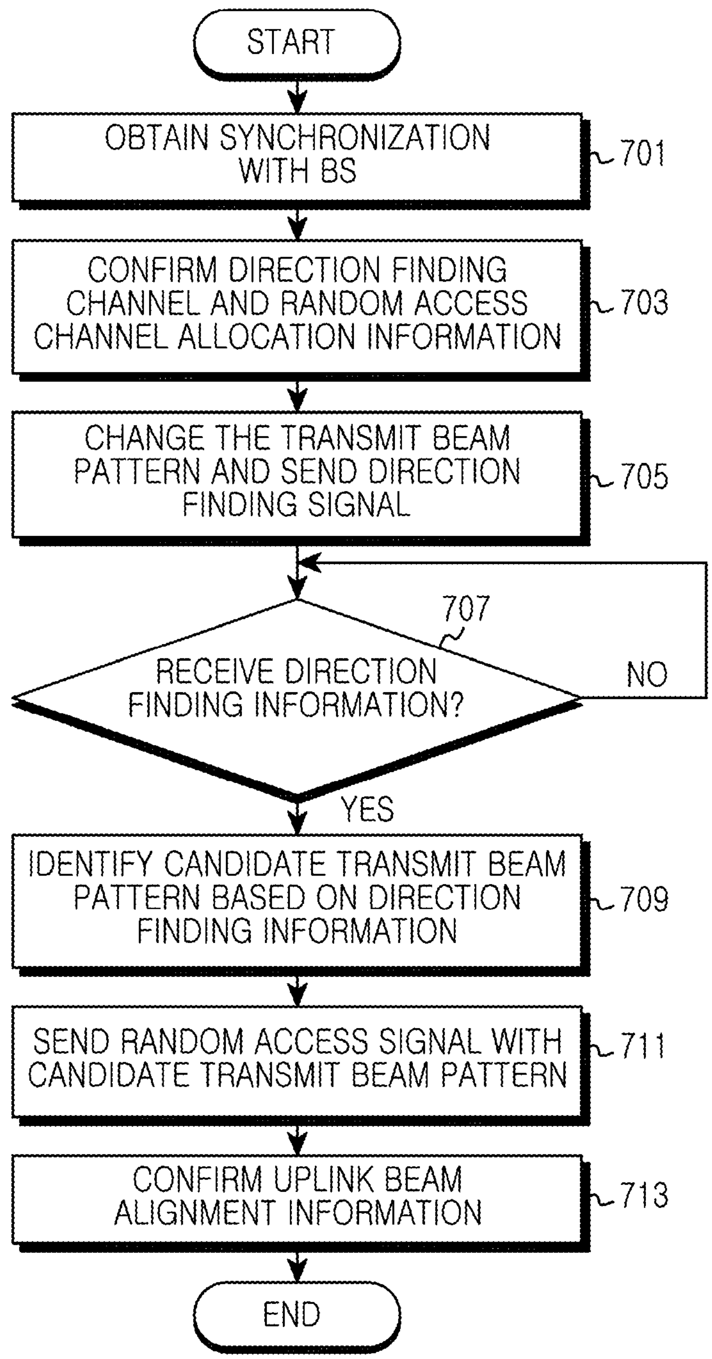
FIG. 7 illustrates a beam alignment method of the mobile station in the wireless communication system according to an exemplary embodiment of the present invention.

FIG. 7 illustrates a beam alignment method of the MS in the wireless communication system according to an exemplary embodiment of the present invention.

Referring to FIG. 7, the MS obtains the synchronization with the BS using the synchronization signal received from the BS in step 701.

In step 703, the MS confirms the resource allocation information of the direction finding channel and the resource allocation information of the random access channel from the cell information received from the BS. Herein, the cell information may further include the information about the number of the receive beam patterns supported by the BS.

In step 705, the MS sends the direction finding signal by considering the resource allocation information of the direction finding channel. For example, the MS sends the direction finding signal by changing the transmit beam pattern per time interval of the direction finding channel as shown in FIG. 3. In so doing, the MS can send the direction finding signal using the minimum tone, subcarrier, or frequency band so as to extend the transmission distance of the direction finding signal, or using the repetition code or the low-code rate code. In addition, the MS can determine the type of the transmit beam to use to send the direction finding signal, according to the number information of the receive beam patterns received from the BS. For example, the MS can send the direction finding signal using the beam in the same transmission direction corresponding to M1, according to the number (M1) of the receive beam patterns to be used by the BS to receive the signal over the direction finding channel. For example, the MS may send the direction finding signal using the beams of the different transmission directions corresponding to N1, according to the number (N1) of the BS for applying the same receive beam in one direction finding channel. The N1 indicate how many times the same receive beam is applied.

In step 707, the MS determines whether the direction finding information is received from the BS.

Upon receiving the direction finding information from the BS, the MS identifies the candidate transmit beam pattern based on the direction finding information in step 709. In detail, the MS identifies the time interval in which the BS receives the direction finding signal, among the time intervals of the direction finding channel based on the direction finding information. In so doing, the MS recognizes the transmit beam pattern with which the BS sends the direction finding signal during the time interval of the received direction finding signal, as the candidate transmit beam pattern. For example, when the BS 400 receives the direction finding signal over the first and 10th time intervals of the direction finding channel as shown in FIG. 4B, the MS 410 recognizes the two transmit beam patterns carrying the direction finding signal over the first and 10th time intervals of the direction finding channel, as the candidate transmit beam patterns.

In step 711, the MS sends the random access signal using the candidate transmit beam pattern. In so doing, the MS sends the random access signal with the candidate transmit beam patterns for all of the receive beam patterns supported by the BS. For example, when the transmit beam patterns #1 and #10 are the candidate transmit beam patterns as shown in FIG. 5, the MS 510 repeatedly sends the random access signal M times over the transmit beam pattern #1 in step 520. Next, the MS 510 repeatedly sends the random access signal over the transmit beam pattern #10 in step 530. Herein, the random access signal includes the identification information of the MS 510. M denotes the number of the receive beam patterns supported by the BS.

In step 713, the MS confirms the optimal MS transmit beam pattern and BS receive beam pattern information selected by the BS, from the uplink beam alignment information received from the BS.

Next, the MS finishes this process.

Figure 10:
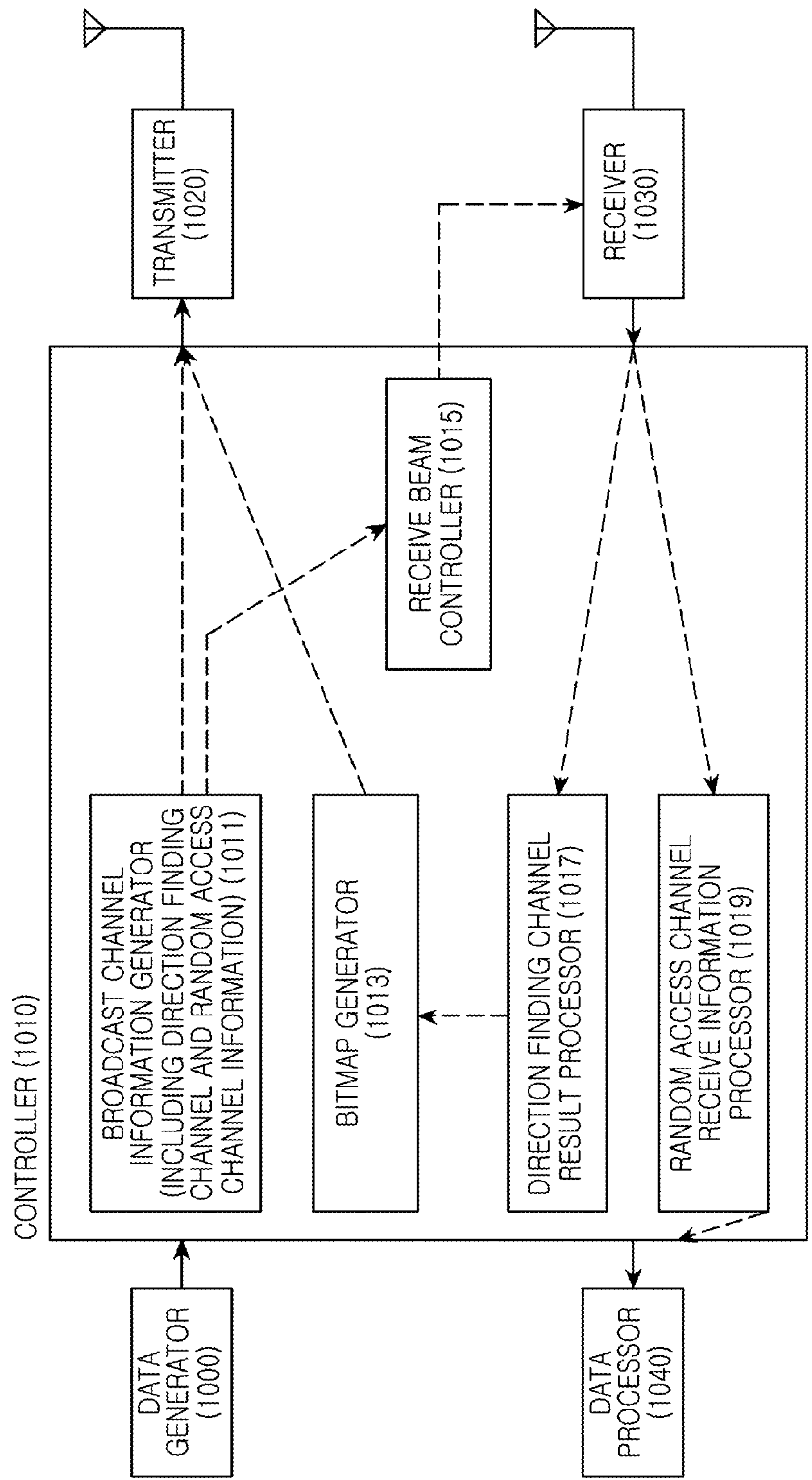
FIG. 10 illustrates the base station for forming the receive beam according to an exemplary embodiment of the present invention.

FIG. 10 is a block diagram of the BS for forming the receive beam according to an exemplary embodiment of the present invention.

As shown in FIG. 10, the BS includes a data generator 1000, a controller 1010, a transmitter 1020, a receiver 1030, and a data processor 1040.

The data generator 1000 generates data and forwards data destined for the MSs from a network or a higher layer to the transmitter 1020 under control of the controller 1010.

The transmitter 1020 converts the data output from the data generator 1000 to an analog signal and transmits the analog signal to the MS over an antenna under the control of the controller 1010.

The receiver 1030 decodes an analog signal received over the antenna to data and sends the decoded data to the data processor 1040 under the control of the controller 1010.

The data processor 1040 forwards the decoded data from the receiver 1030 to the higher layer or the network under the control of the controller 1010.

The controller 1010 controls the data transmission and reception of the BS. In particular, the controller 1010 controls to form the transmit beam for sending the signal via the transmitter 1020 and to form the receive beam for receiving the signal via the receiver 1030. For example, for the beam alignment, the controller 1010 can include a broadcast channel information generator 1011, a bitmap generator 1013, a receive beam controller 1015, a direction finding channel result processor 1017, and a random access channel receive information processor 1019.

The broadcast channel information generator 1011 controls to transmit common system control information to at least one MS over the broadcast channel. Herein, the system control information includes a synchronization signal and the cell information. The cell information includes the resource allocation information of the direction finding channel, the resource allocation information of the random access channel, and the number information of the receive beam patterns supported by the BS. The number information of the receive beam patterns may include the number information of the receive beam patterns to be used by the BS to receive the signal over the direction finding channel. In detail, the number information of the receive beam patterns can include at least one of the number (M1) of the receive beam patterns to be used by the BS to receive the signal over the direction finding channel, and the number (N1) for applying the same receive beam in one direction finding channel.

The broadcast channel information generator 1011 transmits the resource allocation information of the direction finding channel and the random access channel to the receive beam controller 1015 so as to control the receive beam for receiving the signals over the direction finding channel and the random access channel.

The receive beam controller 1015 controls the receive beam to receive the direction finding signal and the random access signal by considering the resource allocation information of the direction finding channel and the random access channel received from the broadcast channel information generator 1011. For example, when receiving the signal over the direction finding channel, the receive beam controller 1015 controls not to use the reception beamforming or controls to use the receive beam pattern of the wide beam width. For example, the receive beam controller 1015 can control to receive the random access signal over the random access channel by changing the receive beam pattern. When the transmit beam patterns #1 and #10 of the MS 510 are the candidate transmit beam patterns as shown in FIG. 5, the receive beam controller 1015 receives the random access signal from the MS 510 in the transmit beam pattern #1 by changing the receive beam pattern in step 520. Next, the receive beam controller 1015 receives the random access signal from the MS 510 in the transmit beam pattern #10 by changing the receive beam pattern in step 530.

When receiving the direction finding signal through the receiver 1030, the direction finding channel result processor 1017 checks the reception result of the direction finding signal under the control of the receive beam controller 1015. In detail, the direction finding channel result processor 1017 confirms information of at least one time interval of the received direction finding signal among the time intervals of the direction finding channel.

The bitmap generator 1013 generates a bitmap based on the reception result of the direction finding signal received from the direction finding channel result processor 1017, and transmits the bitmap to the MS via the transmitter 1020. For example, when the BS 400 receives the direction finding signals in the first and 10th time intervals of FIG. 4A, the bitmap generator 1013 generates and transmits to the MS 410 the bitmap indicating the reception information of the direction finding signals of the first and 10th time intervals as shown in FIG. 4B. Herein, the bitmap of FIG. 4B sets the time interval receiving the direction finding signal to “1”.

The random access channel receive information processor 1019 completes registration of the MS using the random access signal received over the random access channel. In detail, the random access channel receive information processor 1019 selects the optimal transmit beam pattern of the MS and the optimal receive beam pattern of the BS for sending and receiving signals to and from the MS, using the random access signal received over the random access channel.

Figure 11:
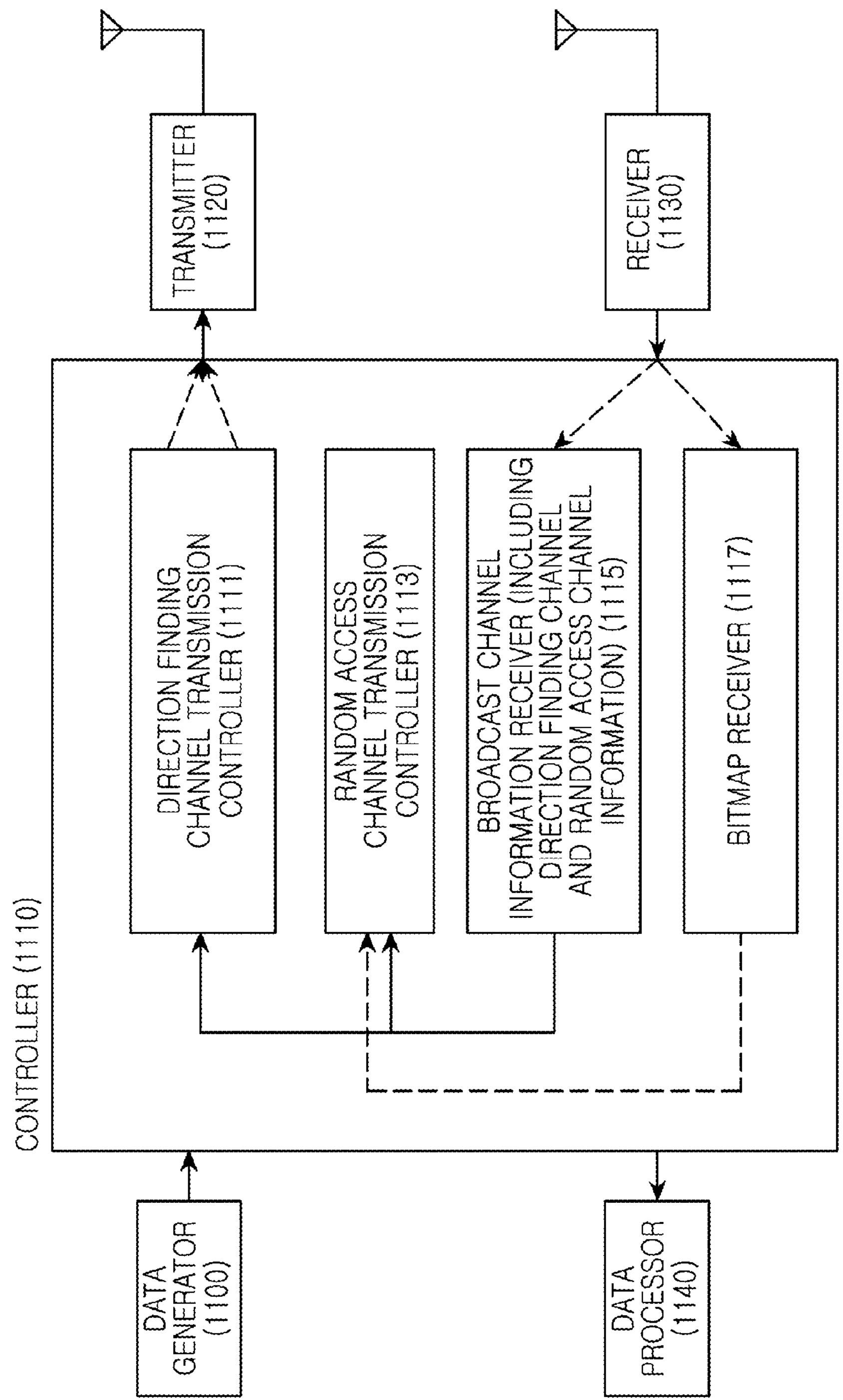
FIG. 11 illustrates the mobile station for forming the transmit beam according to an exemplary embodiment of the present invention.

FIG. 11 is a block diagram of the MS for forming the transmit beam according to an exemplary embodiment of the present invention.

As shown in FIG. 11, the MS includes a data generator 1100, a controller 1110, a transmitter 1120, a receiver 1130, and a data processor 1140.

The data generator 1100 generates data and forwards data from a network or a higher layer to the transmitter 1120 under control of the controller 1110.

The transmitter 1120 converts the data output from the data generator 1100 to an analog signal and transmits the analog signal to the BS over an antenna under the control of the controller 1110.

The receiver 1130 decodes an analog signal received over the antenna to data and sends the decoded data to the data processor 1140 under the control of the controller 1110.

The data processor 1140 forwards the decoded data from the receiver 1130 to the higher layer or the network under the control of the controller 1110.

The controller 1110 controls the data transmission and reception of the MS. In particular, the controller 1110 controls to form the transmit beam for sending the signal via the transmitter 1120 and to form the receive beam for receiving the signal via the receiver 1130. For example, for the transmit beam selection, the controller 1110 can include a direction finding channel transmission controller 1111, a random access channel transmission controller 1113, a broadcast channel information receiver 1115, and a bitmap receiver 1117.

The broadcast channel information receiver 1115 confirms the resource allocation information of the direction finding channel and the resource allocation information of the random access channel in the system control information received from the receiver 1130. Herein, the cell information may further include the information about the number of the receive beam patterns supported by the BS. The resource allocation information of the direction finding channel and the random access channel includes at least one of the location information and the period information of the direction finding channel and the random access channel.

The direction finding channel transmission controller 1111 controls to transmit the direction finding signal through the transmitter 1120 according to the resource allocation information of the direction finding channel confirmed by the broadcast channel information receiver 1115. For example, the direction finding channel transmission controller 1111 controls to send the direction finding signal by changing the transmit beam pattern per time interval of the direction finding channel as shown in FIG. 3. In so doing, the direction finding channel transmission controller 1111 can control to send the direction finding signal using the minimum tone, subcarrier, or frequency band so as to extend the transmission distance of the direction finding signal, or using the repetition code or the low-code rate code. In addition, the direction finding channel transmission controller 1111 can determine the type of the transmit beam to use to send the direction finding signal, according to the number information of the receive beam patterns received from the BS. For example, the direction finding channel transmission controller 1111 can send the direction finding signal using the beam in the same transmission direction corresponding to M1, according to the number (M1) of the receive beam patterns to be used by the BS to receive the signal over the direction finding channel. For example, the direction finding channel transmission controller 1111 may send the direction finding signal using the beams of the different transmission directions corresponding to N1, according to the number (N1) of the BS for applying the same receive beam in one direction finding channel.

The bitmap receiver 1117 confirms the reception result of the direction finding signal of the BS based on the bitmap received through the receiver 1130. For example, the bitmap receiver 1117 identifies the time interval in which the BS receives the direction finding signal, among the time intervals of the direction finding channel.

The random access channel transmission controller 1113 controls to send the random access signal over the random access channel. In so doing, the random access channel transmission controller 1113 controls to send the random access signal using the reception result of the direction finding signal of the BS which is provided from the bitmap receiver 1117. More specifically, the random access channel transmission controller 1113 recognizes the transmit beam pattern with which the BS sends the direction finding signal during the time interval of the received direction finding signal, as the candidate transmit beam pattern. For example, when the BS 400 receives the direction finding signal over the first and 10th time intervals of the direction finding channel as shown in FIG. 4B, the random access channel transmission controller 1113 recognizes the two transmit beam patterns carrying the direction finding signal over the first and 10th time intervals of the direction finding channel, as the candidate transmit beam patterns.

Next, the random access channel transmission controller 1113 controls to send the random access signal using the candidate transmit beam pattern. In so doing, the random access channel transmission controller 1113 controls to send the random access signal in the candidate transmit beam patterns for all of the receive beam patterns supported by the BS. For example, when the transmit beam patterns #1 and #10 are the candidate transmit beam patterns as shown in FIG. 5, the random access channel transmission controller 1113 repeatedly sends the random access signal M times with the transmit beam pattern #1 in step 520. Next, the random access channel transmission controller 1113 repeatedly sends the random access signal M times with the transmit beam pattern #10 in step 530.

Figure 8:
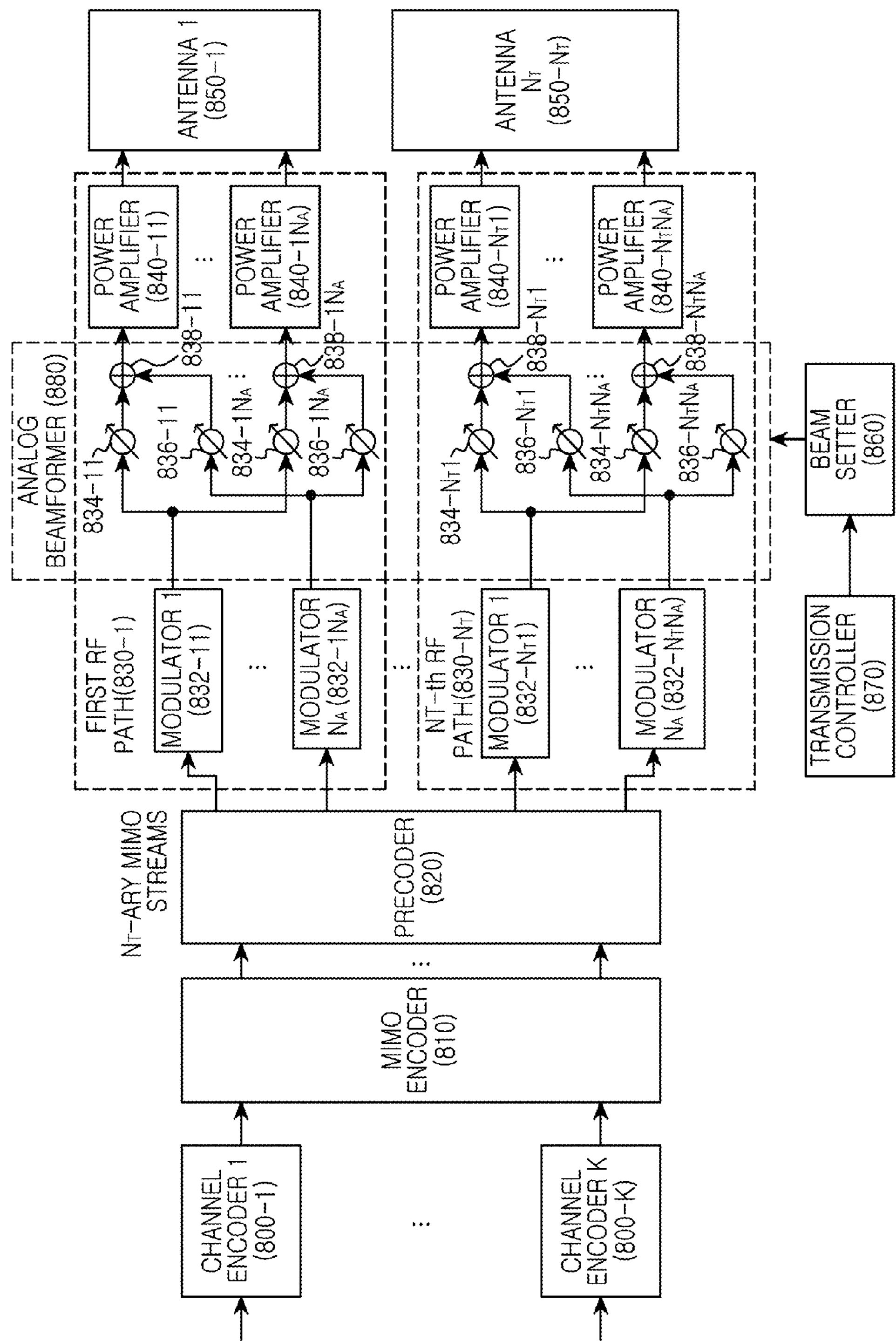
FIG. 8 illustrates the mobile station in detail for forming the transmit beam according to an exemplary embodiment of the present invention.
Figure 9:
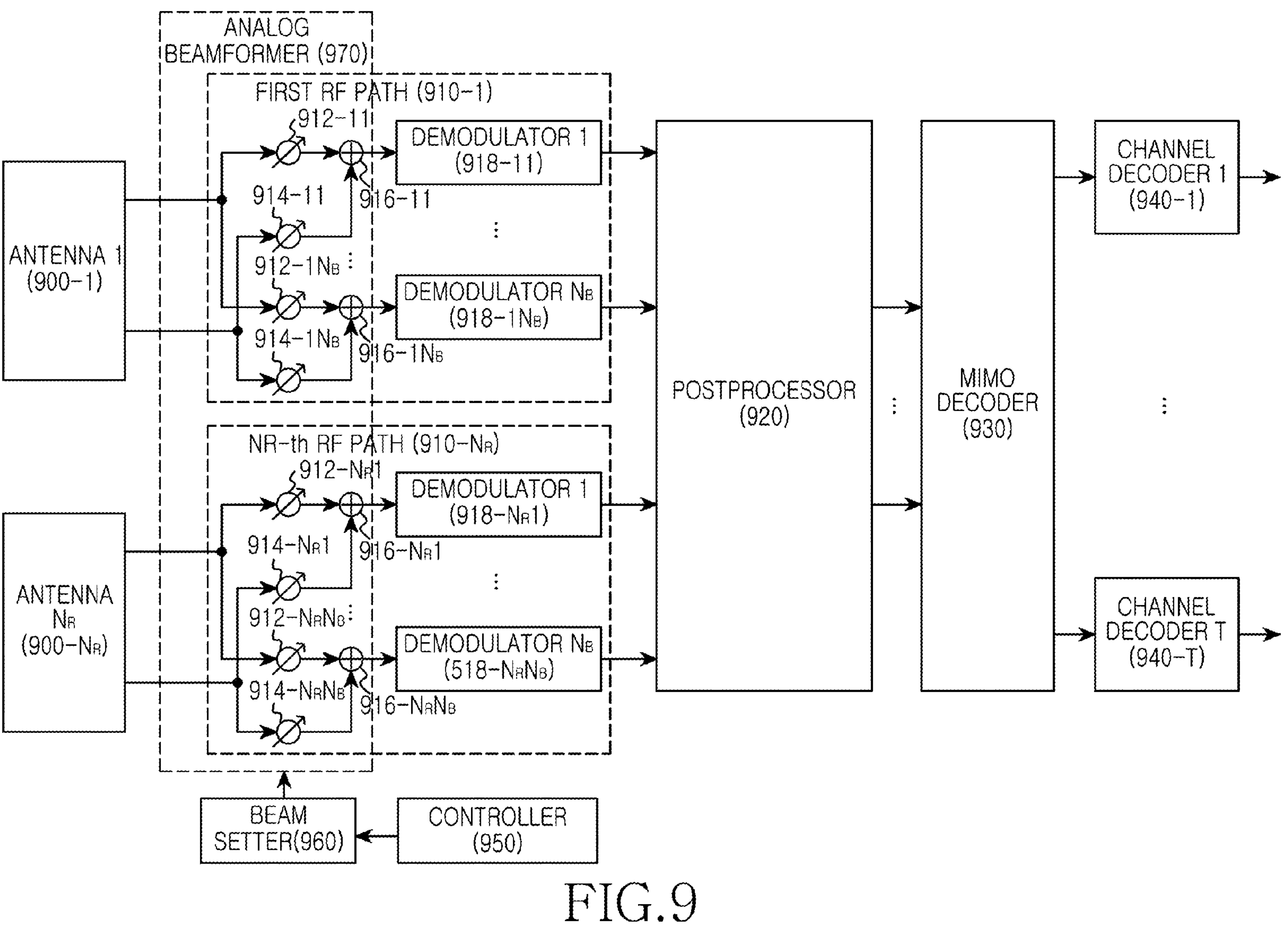
FIG. 9 illustrates the base station in detail for forming the receive beam according to an exemplary embodiment of the present invention.

As above, the BS and the MS can be constructed as shown in FIGS. 8 and 9, to apply to the beamforming system.

FIG. 8 is a detailed block diagram of the MS for forming the transmit beam according to an exemplary embodiment of the present invention. Herein, the MS is assumed to adopt a digital/analog hybrid beamforming scheme, although the present invention is not limited thereto.

As shown in FIG. 8, the MS includes K-ary channel encoders 800-1 through 800-K, a Multiple Input Multiple Output (MIMO) encoder 810, a precoder 820, $N_T$-ary Radio Frequency (RF) paths 830-1 through 830-$N_T$, $N_T$-ary antennas 850-1 through 850-$N_T$, a beam setter 860, and a transmission controller 870.

The K-ary channel encoders 800-1 through 800-K each include a channel encoder and a modulator for encoding, modulating and outputting a signal to transmit to the receiving stage.

The MIMO encoder 810 multiplexes the modulated signals fed from the K-ary channel encoders 800-1 through 800-K, to signals to transmit through $N_T$-ary streams in order to send the signals over the $N_T$-ary antennas 850-1 through 850-$N_T$.

The precoder 820 precodes the $N_T$-ary signals fed from the MIMO encoder 810 to precode for the digital beamforming, and provides the precodes to the RF paths 830-1 through 830-$N_T$ respectively.

The $N_T$-ary RF paths 830-1 through 830-$N_T$ each process the signals fed from the precoder 820 in order to output the signals through the corresponding antennas 850-1 through 850-$N_T$. In so doing, the $N_T$-ary RF paths 830-1 through 830-$N_T$ are constructed identically. Thus, only the first RF path 830-1 is explained here. The other $N_T$-ary RF paths 830-2 through 830-$N_T$ are constructed the same as the first RF path 830-1.

The first RF path 830-1 includes $N_A$-ary modulators 832-11 through 832-1$N_A$, an analog beamformer 880, and $N_A$-ary power amplifiers 840-11 through 840-1$N_A$. Herein, the $N_A$ denotes the number of antenna elements constituting the first antenna 850-1.

The $N_A$-ary modulators 832-11 through 832-1$N_A$ each modulate and output the signal fed from the precoder 820 according to a communication scheme. For example, the $N_A$-ary modulators 832-11 through 832-1$N_A$ may each include (not shown) an Inverse Fast Fourier Transform (IFFT) operator and a Digital to Analog Converter (DAC). The IFFT operator converts the signal output from the precoder 820 to a time-domain signal using IFFT. The DAC converts the time-domain signal output from the IFFT operator to an analog signal.

The analog beamformer 880 shifts a phase of the $N_A$-ary transmit signals output from the $N_A$-ary modulators 832-11 through 832-1$N_A$ according to a transmit beam weight provided from the beam setter 860. For example, the analog beamformer 880 includes a plurality of phase shifters 834-11 through 834-1$N_A$ and 836-11 through 836-1$N_A$, and combiners 838-11 through 838-1$N_A$. The $N_A$-ary modulators 832-11 through 832-1$N_A$ each split the output signal to $N_A$-ary signals and output the $N_A$-ary signals to the respective phase shifters 834-11 through 834-1$N_A$ and 836-11 through 836-1$N_A$. The phase shifters 834-11 through 834-1$N_A$ and 836-11 through 836-1$N_A$ change the phase of the signals output from the $N_A$-ary modulators 832-11 through 832-1$N_A$ according to the transmit beam weight provided from the beam setter 860. The combiners 838-11 through 838-1$N_A$ combine the output signals of the phase shifters 834-11 through 834-1$N_A$ and 836-11 through 836-1$N_A$ corresponding to the antenna elements.

The power amplifiers 840-11 through 840-1$N_A$ each amplify the power of the signal output from the combiners 838-11 through 838-1$N_A$ and output the amplified signal to the outside through the first antenna 850-1.

The beam setter 860 selects the transmit beam pattern to be used to transmit the signal, and provides the transmit beam weight according to the selected transmit beam pattern to the analog beamformer 890 under control of the transmission controller 870. For example, the beam setter 860 provides the analog beamformer 880 with the transmit beam weight according to the transmit beam pattern for carrying the direction finding signal under the control of the transmission controller 870. For example, the beam setter 860 provides the analog beamformer 880 with the transmit beam weight according to the candidate transmit beam pattern for carrying the random access signal under the control of the transmission controller 870.

The transmission controller 870 controls the beam setter 860 to select the transmit beam pattern so as to form the transmit beam. For example, the transmission controller 870 controls the beam setter 860 to send the direction finding signal by changing the transmit beam pattern per time interval of the direction finding channel. In so doing, the transmission controller 870 controls to send the direction finding signal by considering the resource allocation information of the direction finding channel confirmed in the cell information received from the BS. The transmission controller 870 can control to send the direction finding signal using the minimum tone, subcarrier, or frequency band so as to extend the transmission distance of the direction finding signal, or using the repetition code or the low-code rate code.

The transmission controller 870 determines the candidate transmit beam pattern by taking into account the direction finding information received from the BS. In detail, the transmission controller 870 identifies the time interval of the BS receiving the direction finding signal, based on the direction finding information. In so doing, the transmission controller 870 recognizes the transmit beam pattern with which the BS sends the direction finding signal during the time interval of the received direction finding signal, as the candidate transmit beam pattern. For example, when the BS 400 receives the direction finding signal over the first and 10th time intervals of the direction finding channel as shown in FIG. 4B, the transmission controller 870 recognizes the two transmit beam patterns carrying the direction finding signal over the first and 10th time intervals of the direction finding channel, as the candidate transmit beam patterns.

The transmission controller 870 controls the beam setter 860 to send the random access signal in the candidate transmit beam pattern. In so doing, the transmission controller 870 controls the beam setter 860 to repeatedly send the random access signal with the candidate transmit beam patterns for all of the receive beam patterns supported by the BS. For example, when the transmit beam patterns #1 and #10 are the candidate transmit beam patterns as shown in FIG. 5, the transmission controller 870 controls the beam setter 860 to repeatedly send the random access signal M times with the transmit beam pattern #1. Next, the transmission controller 870 controls the beam setter 860 to repeatedly send the random access signal M times with the transmit beam pattern #10. Herein, M denotes the number of the receive beam patterns supported by the BS.

In this exemplary embodiment, the MS includes the transmitter for supporting the transmission beamforming. The MS further includes a receiver (not shown) for receiving the signal from the BS. The MS receives the cell information, the direction finding information, and the uplink beam alignment information through the receiver.

FIG. 9 is a detailed block diagram of the BS for forming the receive beam according to an exemplary embodiment of the present invention. Herein, the BS is assumed to adopt the digital/analog hybrid beamforming scheme, although the present invention is not limited thereto.

As shown in FIG. 9, the BS includes $N_R$-ary antennas 900-1 through 900-$N_R$, $N_R$-ary RF paths 910-1 through 910-$N_R$, a postprocessor 920, a MIMO decoder 930, T-ary channel decoders 940-1 through 940-T, a controller 950, and a beam setter 960.

The $N_R$-ary RF paths 910-1 through 910-$N_R$ process the signals received via the corresponding antennas 900-1 through 900-$N_R$. The $N_R$-ary RF paths 910-1 through 910-$N_R$ are constructed identically. Accordingly, only the structure of the first RF path 910-1 is mainly described. The other RF paths 910-2 through 910-$N_R$ are constructed the same as the first RF path 910-1.

The first RF path 910-1 includes an analog beamformer 970 and $N_B$-ary demodulators 918-11 through 918-1$N_B$. Herein, the $N_B$ denotes the number of antenna elements constituting the first antenna 900-1.

The analog beamformer 970 shifts and outputs a phase of the $N_B$-ary received signals output from the antenna elements of the first antenna 900-1 according to a transmit beam weight provided from the beam setter 960. For example, the analog beamformer 970 includes a plurality of phase shifters 912-11 through 912-1$N_B$ and 914-11 through 914-1$N_B$, and combiners 916-11 through 916-1$N_B$. The antenna elements of the first antenna 900-1 split the received signal to $N_B$-ary signals and output them to the respective phase shifters 912-11 through 912-1 $N_B$ and 914-11 through 914-1$N_B$. The phase shifters 912-11 through 912-1$N_B$ and 914-11 through 914-1$N_B$ change the phase of the signals output from the antenna elements of the first antenna 900-1 according to a receive beam weight provided from the beam setter 960. The combiners 916-11 through 916-1$N_B$ combine the output signals of the phase shifters 912-11 through 912-1$N_B$ and 914-11 through 914-1$N_B$ corresponding to the antenna elements.

The $N_B$-ary demodulators 918-11 through 918-1$N_B$ demodulate and output the received signals fed from the combiners 916-11 through 916-1$N_B$ according to the communication scheme. For example, the $N_B$-ary demodulators 918-11 through 918-1$N_B$ may each include (not shown) an Analog to Digital Converter (ADC) and a Fast Fourier Transform (FFT) operator. The ADC converts the received signal fed from the combiners 916-11 through 916-1$N_B$ to a digital signal. The FFT operator converts the signal fed from the ADC to a frequency-domain signal using the FFT.

The postprocessor 920 post-decodes the signals fed from the $N_R$-ary RF paths 910-1 through 910-$N_R$ according to the precoding scheme of the transmitting stage, and provides the post-decoded signals to the MIMO decoder 930.

The MIMO decoder 930 multiplexes the $N_R$-ary received signals output from the postprocessor 920 to T-ary signals so that the T-ary channel decoders 940-1 through 940-T can decode the signals.

The T-ary channel decoders 940-1 through 940-T may each include (not shown) a demodulator and a channel decoder for demodulating and decoding the signal received from the transmitting stage.

The controller 950 controls the operations of the BS for the beam alignment. For example, the controller 950 controls the uplink beam alignment with the MS which requests the initial access. In detail, the controller 950 transmits the cell information including the resource allocation information of the direction finding channel, the resource allocation information of the random access channel, and the number information of the receive beam patterns supported by the BS, over the service coverage area. Next, the controller 950 controls to receive the direction finding signal in each time interval of the direction finding channel. In so doing, the controller 950 controls the beam setter 960 to receive the direction finding signal without the reception beamforming or with the receive beam pattern of the wide beam width.

The controller 950 transmits the direction finding information including the information of the at least one time interval of the received direction finding signal among the time intervals of the direction finding channel, over the service coverage area. For example, the controller 950 transmits the bitmap indicating whether the direction finding signal of each time interval is received, to the service coverage area as shown in FIG. 4B. Herein, the controller 950 determines whether the direction finding signal is received in each time interval by considering the receive power of the time interval or the correlation value of the received signal.

Next, the controller 950 controls the beam setter 960 to receive the random access signal through the random access channel while changing the receive beam pattern. For example, when the transmit beam patterns #1 and #10 of the MS 510 are the candidate transmit beam patterns as shown in FIG. 5, the controller 950 controls the beam setter 960 to change the receive beam pattern and to receive the random access signal from the MS 510 with the transmit beam pattern #1. Next, the controller 950 controls the beam setter 960 to change the receive beam pattern and to receive the random access signal from the MS 510 with the transmit beam pattern #10.

The controller 950 selects the optimal MS transmit beam pattern and the optimal BS receive beam pattern using the random access signals received with the receive beam patterns, so as to send and receive signals to and from the MS. For example, the controller 950 transmits to the MS, the uplink beam alignment information including the optimal MS transmit beam pattern and BS receive beam pattern information.

The beam setter 960 provides the receive beam weight to the analog beamformer 970 so as to receive the signal in the receive beam pattern corresponding to the transmit beam pattern selected by the transmitting stage or the controller 950 from among the multiple receive beam patterns supported.

In this exemplary embodiment, the BS includes the receiver for supporting the reception beamforming. The BS further includes a transmitter (not shown) for sending the signal to the MS. The BS transmits the cell information, the direction finding information, and the uplink beam alignment information through the transmitter.

In this exemplary embodiment, the wireless communication system conducts the uplink beam alignment in the initial access of the MS.

Alternatively, the wireless communication system may carry out the beam alignment in the same manner during the communication of the BS and the MS.

As set forth above, since the transmitting stage aligns the beam using only some of the transmit beam patterns supportable in the beamformed wireless communication system, it is possible to reduce the delay in selecting the optimal transmit beam pattern and receive beam pattern.

In the initial access of the MS, the uplink beam alignment is fulfilled using only some of the transmit beam patterns supportable by the transmitting stage. Thus, the initial access delay of the MS can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting a beam pattern in a Base Station (BS) of a wireless communication system which generates a plurality of beam patterns, the method comprising:
determining whether a direction finding signal is received through each interval of a direction finding channel;
transmitting information of whether the direction finding signal is received with respect to each of the intervals of the direction finding channel;
changing a receive beam pattern and receiving a random access signal from a Mobile Station (MS) with at least one transmit beam pattern over a random access channel; and
selecting one of transmit beam patterns of the MS and one of receive beam patterns of the BS according to the random access signal.

2. The method of claim 1, further comprising:
before determining whether the direction finding signal is received, transmitting resource allocation information of the direction finding channel and resource allocation information of the random access channel.

3. The method of claim 1, wherein the determining of whether the direction finding signal is received comprises:
determining whether the direction finding signal is received in each of the intervals, according to a receive power of each of the intervals of the direction finding channel or a correlation value of a received signal.

4. The method of claim 1, wherein the determining of whether the direction finding signal is received comprises:
determining whether the direction finding signal is received in each of the intervals of the direction finding signal, without applying reception beamforming.

5. The method of claim 1, wherein the determining of whether the direction finding signal is received comprises:
determining whether the direction finding signal is received in each of the intervals of the direction finding channel, using a receive beam pattern of a wide beam width.

6. The method of claim 1, wherein the transmitting of the information of whether the direction finding signal is received comprises:
generating and transmitting to a service coverage area, a bitmap indicating whether the direction finding signal is received in each of the intervals of the direction finding channel.

7. The method of claim 1, further comprising:
after selecting the one of the transmit beam patterns and the one of the receive beam patterns, transmitting the one transmit beam pattern and the one receive beam pattern to the MS.

8. A method for transmitting a signal in a Mobile Station (MS) of a wireless communication system which generates a plurality of beam patterns, the method comprising:
changing a transmit beam pattern and transmitting a direction finding signal to a Base Station (BS) through intervals of a direction finding channel;
identifying at least one interval in which the BS receives the direction finding signal from among the intervals of the direction finding channel;
determining a transmit beam pattern carrying the direction finding channel in the at least one interval in which the BS receives the direction finding signal as a candidate transmit beam pattern; and
transmitting a random access signal to the BS using the candidate transmit beam pattern.

9. The method of claim 8, further comprising:
before transmitting the random access signal to the BS, receiving resource allocation information of the direction finding channel and resource allocation information of a random access channel from the BS.

10. The method of claim 8, wherein the transmitting of the random access signal comprises:
changing the transmit beam pattern and transmitting the direction finding signal in the intervals of the direction finding channel by concentrating a transmit power to any one of a minimum tone, a subcarrier, and a frequency band capable of carrying the direction finding signal.

11. The method of claim 8, wherein the transmitting of the random access signal comprises:
changing the transmit beam pattern and transmitting the direction finding signal in the intervals of the direction finding channel using a repetition code or a low-code rate code.

12. The method of claim 8, wherein the identifying of the at least one interval comprises:
identifying the at least one interval in which the BS receives the direction finding signal from among the intervals of the direction finding channel, based on a bitmap received from the BS.

13. The method of claim 8, wherein the transmitting of the random access signal comprises:
repeatedly transmitting the random access signal with each candidate transmit beam pattern by considering a number of receive beam patterns supported by the BS.

14. An apparatus for selecting a beam pattern in a Base Station (BS) of a wireless communication system which generates a plurality of beam patterns, the apparatus comprising:
at least one antenna comprising a plurality of antenna elements;
a transmitter for transmitting information of whether a direction finding signal is received with respect to each interval of a direction finding channel; and
a controller for determining whether the direction finding signal is received in each of the intervals of the direction finding channel, and for selecting one of transmit beam patterns of a Mobile Station (MS) and one of receive beam patterns of the BS according to a random access signal received by changing a receive beam pattern over a random access channel.

15. The apparatus of claim 14, wherein the transmitter transmits resource allocation information of the direction finding channel and resource allocation information of the random access channel.

16. The apparatus of claim 14, wherein the controller determines whether the direction finding signal is received in each of the intervals according to a receive power of each of the intervals of the direction finding channel or a correlation value of a received signal.

17. The apparatus of claim 14, further comprising:

a beam setter for selecting a receive beam pattern to receive a signal through the at least one antenna from among a plurality of receive beam patterns supportable by the BS.

18. The apparatus of claim 17, wherein the controller controls the beam setter to receive the direction finding signal without applying reception beamforming, or by using a receive beam pattern of a wide beam width.

19. The apparatus of claim 14, wherein the transmitter generates and transmits to a service coverage area, a bitmap indicating whether the direction finding signal is received in each of the intervals of the direction finding channel.

20. The apparatus of claim 14, wherein the transmitter transmits information of the one transmit beam pattern and the one receive beam pattern selected by the controller, to the MS.

21. An apparatus for transmitting a signal in a Mobile Station (MS) of a wireless communication system which generates a plurality of beam patterns, the apparatus comprising:

at least one antenna comprising a plurality of antenna elements;

a beam setter for selecting a transmit beam pattern to transmit a signal through the at least one antenna, from among a plurality of transmit beam patterns supportable by the MS;

a transmitter for changing the transmit beam pattern and for transmitting a direction finding signal to a Base Station (BS) through intervals of a direction finding channel; and a controller for determining a transmit beam pattern carrying the direction finding channel in at least one interval in which the BS receives the direction finding signal from among the intervals of the direction finding channel as a candidate transmit beam pattern, wherein the transmitter transmits a random access signal to the BS using the candidate transmit beam pattern determined by the controller.

22. The apparatus of claim 21, wherein the controller confirms resource allocation information of the direction finding channel and resource allocation information of a random access channel received from the BS.

23. The apparatus of claim 21, wherein the transmitter changes the transmit beam pattern and transmits the direction finding signal in the intervals of the direction finding channel by concentrating a transmit power to any one of a minimum tone, a subcarrier, and a frequency band capable of carrying the direction finding signal.

24. The apparatus of claim 21, wherein the transmitter changes the transmit beam pattern and transmits the direction finding signal in the intervals of the direction finding channel using a repetition code or a low-code rate code.

25. The apparatus of claim 21, wherein the controller identifies the at least one interval in which the BS receives the direction finding signal from among the intervals of the direction finding channel based on a bitmap received from the BS.

26. The apparatus of claim 21, wherein the transmitter repeatedly transmits the random access signal with each candidate transmit beam pattern according to a number of receive beam patterns supported by the BS.

* * * * *